(No Model.) 2 Sheets—Sheet 1.
E. THOMSON.
ELECTRIC RECIPROCATING MOTOR.
No. 520,810. Patented June 5, 1894.
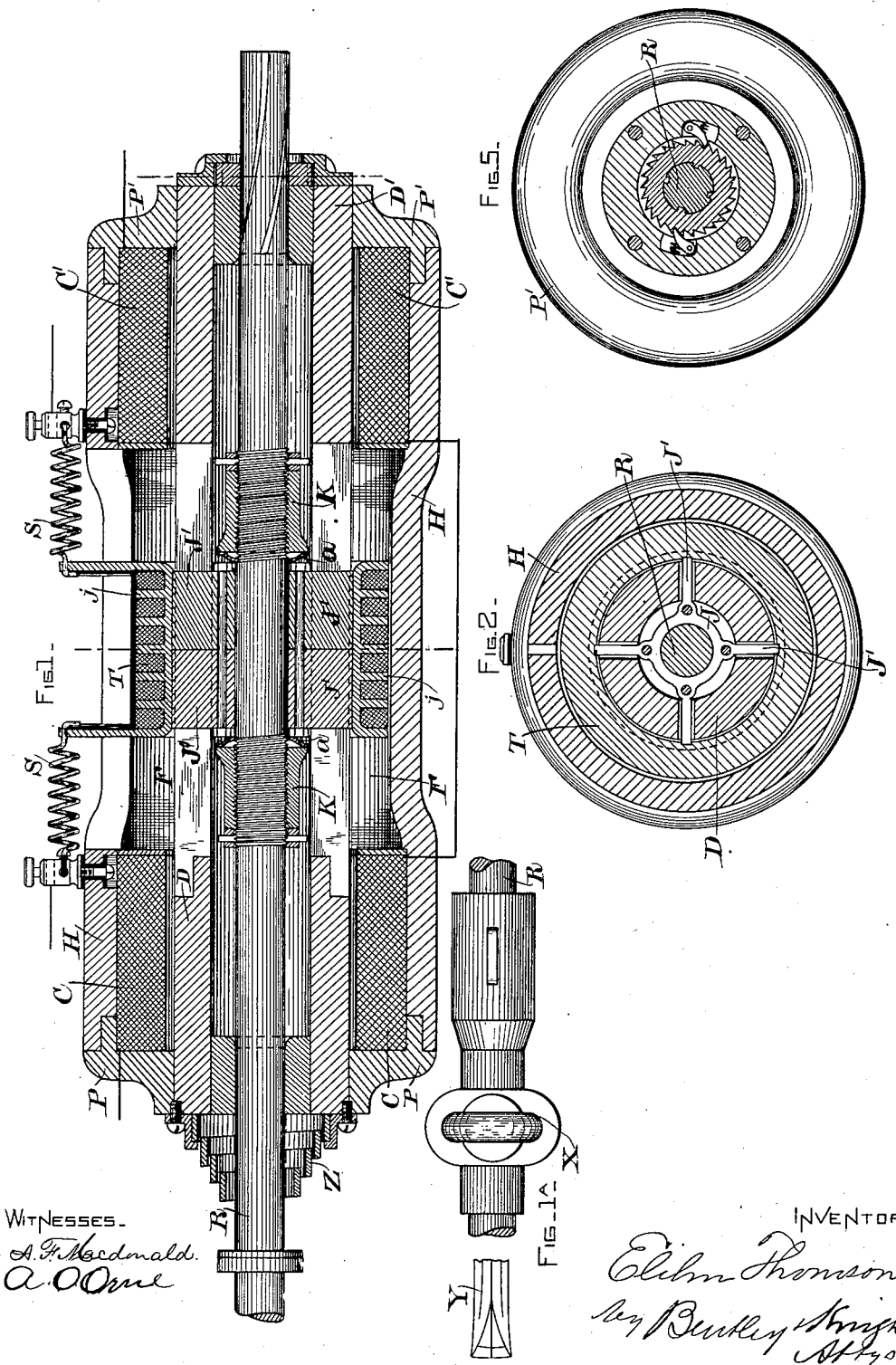

(No Model.) 2 Sheets—Sheet 2.
E. THOMSON.
ELECTRIC RECIPROCATING MOTOR.
No. 520,810. Patented June 5, 1894.
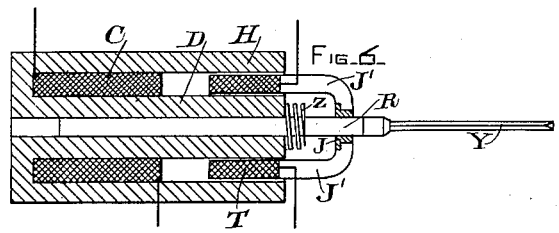
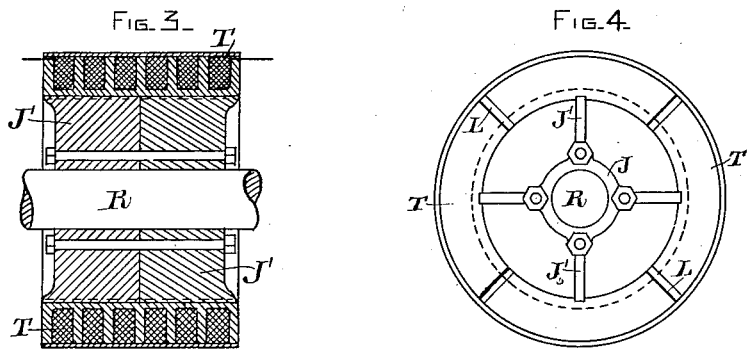
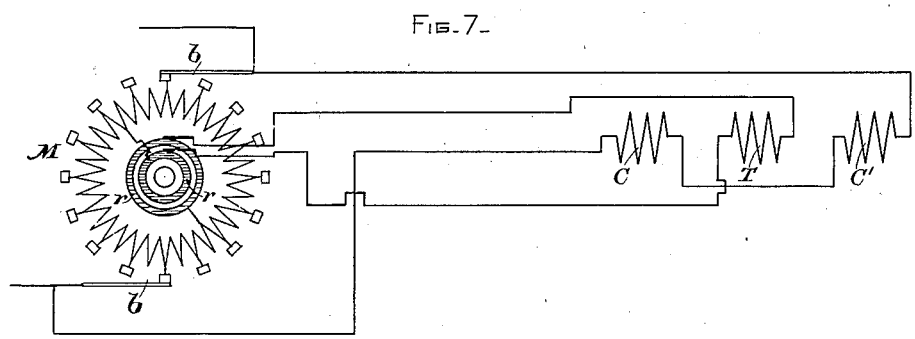
Witnesses—
A. F. Macdonald.
A. A. Orne
Inventor—
Elihu Thomson
by Bentley & Knight
Attys.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

ELECTRIC RECIPROCATING MOTOR.

SPECIFICATION forming part of Letters Patent No. 520,810, dated June 5, 1894.

Application filed July 10, 1891. Serial No. 399,043. (No model.)

*To all whom it may concern:*

Be it known that I, ELIHU THOMSON, a citizen of the United States, residing at Swampscott, in the county of Essex and State of Massachusetts, have invented a certain new and useful Improvement in Electric Reciprocating Motors, of which the following is a specification.

The present invention relates to electric reciprocating mechanism, such as rock drilling machines operated by electric currents, and has for its object the production of a vigorous reciprocating machine operated by electric currents with a maximum of efficiency and economy.

The invention while applied directly to rock drills is applicable to other cases in which it is desirable that a powerful reciprocating movement may be obtained from electric currents. I utilize in my invention a continuous current for polarizing the apparatus and an alternating undulatory current for causing the movable portion of the apparatus to vibrate at a proper rate; the alternating current being caused to have its periods of alternation to correspond with the natural period of vibration of the apparatus. The continuous current is made to set up a circular or transverse field of magnetism and alternating currents are sent through a movable coil placed in said field so as to cause vibration of said coil.

In the accompanying drawings Figure 1 is a longitudinal section of an electric reciprocating motor embodying the invention. Fig. 1ª shows the drill to be attached thereto. Figs. 2, 3 and 4 are detail views of the armature; Fig. 5, section through the plunger-rotating device. Fig. 6 shows a simplified form of the motor. Fig. 7 is a diagram of the operating circuit connections.

The coils C C' in Fig. 1 are wound around a central core D D' composed of a hollow iron tube having flanged plates P, P' at the ends, and having an outer iron shell H inclosing the coils C, C'. These portions form a magnetic circuit around the coils and give rise to an intense magnetic field at the portions F, F, or in the annular space separating the two iron tubes. The coils C, C, C', C', are wound so that the current moves through them in opposite directions and therefore produces consequent polarity in the center core D, D', the magnetic circuit being closed through the annular or other shaped air space and the outer casing H. Mounted in the annular or transverse field formed is a movable coil or set of coils T fitting or almost filling the space transversely and moving longitudinally. This being a movable coil connections are made by springs or other current conveying portions, as at S, S, to proper posts for conveying current to the moving coils. A single coil at T may be used but it is much better to divide the coil into a number of separate coils carried in a frame and having holding devices or bobbins. Such bobbins may be made of German silver or non-magnetic metal, but I prefer in many cases to construct them of wrought iron and wind the wire securely in grooves or annular spaces formed therein between diaphragms or separators *j, j*. This spool or bobbin is carried upon a spider J, J, in the same manner as an armature would be carried upon its spider, the spider having arms J, J, constituting webs connecting the bobbins supporting the coil T, and a central hub through which the central axis or reciprocating rod R passes, as is clearly shown in Fig. 2. When the spool or coil of wire is divided into separate portions, as above described, the winding and connections must be such as to cause the current to traverse them in the same direction. In other words, the several portions must be magnetically similar so as to form in magnetic effect a single coil. In Fig. 3 the portion which constitutes the movable coil or reciprocating armature of the apparatus is shown separately in section. It is desirable that its electrical continuity be broken or cut by slots running transversely to its periphery, as seen in Fig. 4 at L L. It is in fact desirable that the iron masses such as the shell H, H, and the core D, D, be properly slit in a direction transverse to their circumference, or transverse to a line parallel to the winding on the bobbin T, T. This is for the purpose of preventing the circulation of induced currents during the reciprocations of this part of the magnetic field. It is preferred to have the portion J, J, or the hub of the same sleeved upon a central rod R, R, and held between buffers or very stiff springs of a slight range of compressibility, as at $a$, $a$, the structure being held in place between screw collars K, K, fixed or sustained by the central axis or rod R. At the upper part of the rod R are provided devices for rotating the rod, shown more in detail in Fig. 5, these devices consisting of a spiral slot engaging with a feather on a ratchet wheel as shown. The central axis bears a chuck or clutch for holding a rock drill, as seen at X, Y, and a spring Z is placed so as to be compressed on the up stroke of the rod so as to diminish the upward blow and accelerate the downward stroke.

Fig. 6 shows a simplified construction, where only a single coil C is used to magnetize the central core D, which is continued to form a return magnetic circuit such as an outer shell H. In the polar or magnetic space between these two portions of iron is placed the coil T carried by the proper supports J', J', centering on the axis R, which carries the drill for reciprocation. Current of an alternating character passing in the coil T while in a strongly energized transverse magnetic field, causes vigorous motion or tendency to motion back and forth in the polar space or transverse magnetic field. In like manner the action of the devices shown in Figs. 1, 2, 3 and 4 is dependent upon the passage of an alternating current of slow period through the movable coil or the bobbin or carrier T, while immersed in a transverse magnetic field of great strength provided by the continuous current which passes in the coils C, C'. There results a vibration or longitudinal oscillation in synchronism with the alternating currents passing, it being necessary to adapt the period to the natural rate of vibration of the moving parts of the apparatus, as if the alternations are much too fast the apparatus will not keep up with them. The function of the spring Z is not only to take up the blows which are struck in the upward direction, and which are therefore of no utility for the actual work of the apparatus, but also to suddenly and quickly reverse the motion so that the movement does not lag nor get behind the period of the impulses of current. The spring then is an accelerator of the phase, as it may be termed. The springs S also serve to increase the rate of vibration. The field of magnetism in the annular air space is called a transverse field because its lines are in planes transverse to the core axis. The construction Fig. 6 if elaborated and provided with the various appliances for rotation, for rebound, &c., would differ in no respect practically, from that in Fig. 1, except in the removal of one set of energizing coils C', for example, and the accompanying iron masses, and this would be in many cases a simplified and preferable construction.

The diagram, Fig. 7, shows one of the means which may be employed for operating the apparatus or furnishing it with the proper currents. At M is a dynamo machine or motor, or a continuous current transformer, the winding on the armature of which is, as indicated, on closed circuit, similar to a Gramme or Siemens armature. Commutator segments are attached as usual at points along the length of the winding around the armature while brushes $b$, $b$, rest thereon for taking up or conveying currents to the same. It is of course assumed that the armature revolves in a magnetic field suitably provided, and rings $r$, $r$, are shown as attached to opposite points of the winding with brushes resting on these rings for the conveyance of alternating impulses to the alternating coil or movable coil of the apparatus, T, while connections from the brushes $b$, $b$, on the commutator are carried to the energizing or continuous current coil C, C'. It will readily be understood that the machine M with the rings and with the commutator winding will apply to any bi-polar construction of armature, and that current may be fed from the line to said machine and drive it as a motor, the attachments being then made from the exterior source to the brushes $b$, $b$, in which case it will by its rotation generate alternating currents and deliver them to the rings $r$, $r$, and the coil T, while continuous currents will pass to the coils C' C'. Or the machines if driven by power will generate currents as a dynamo in like manner and so feed the coils, its speed in each case being kept at a rate such as will provide the proper rate of alternating impulses to the coil T. It therefore becomes a slow speed machine. Furthermore the part represented by the letter M may be a winding with its attachments existing on a motor transformer or motor dynamo in which a separate winding fed by current of different potential causes rotation of the machine, and the winding represented by M furnishes current to the reciprocating apparatus.

While in the description above, the magnetic field has been shown as annular and the magnetic lines radial or transverse to the axis of apparatus it is evident that the shape of the central core if rectangular or polygonal instead of round would require a similar shaped coil and bobbin to fit the space. Also it will be evident that while the field is spread uniformly around the axis in the circular space, owing to the part H surrounding the central core on all sides, my invention would be present were the part H to only partially surround the core, or be carried up at two sides only for example, in which case the magnetic transverse field would not be evenly distributed around the axis, but would be densest opposite the portions of the shell H provided.

As before stated, my invention consists in the combination with a magnet having such an annular or transverse field of a reciprocating coil movable in such field under the influence of an alternating current traversing the coil.

What I claim as new, and desire to secure by Letters Patent, is—

1. The combination of the relatively movable coils or magnets, one of which is supplied with continuous currents, and the other with unbroken undulatory alternating currents of a definite rate of alternation, to cause vibration of one of the coils or magnets, the movable coil with its attached parts having a definite inherent rate of vibration corresponding with the rate of alternation of the propelling current.

2. The combination of the relatively movable coils or magnets, one of which is supplied with continuous currents and the other with unbroken undulatory alternating currents of a definite rate of alternation, to cause vibration of one of the coils or magnets, the movable coil with its attached parts having resilient devices engaging therewith, and having a definite rate of vibration under the influence of the alternating current and the resilient devices, substantially corresponding to the rate of alternation of the current.

3. The combination of the continuously energized magnet having outer and inner pole portions, forming between them a transverse field, a coil movable in said field between such pole pieces and traversed by an alternating undulatory current.

4. The combination of the continuously energized magnet, having outer and inner pole portions, forming between them a surrounding or transverse field and air space, and a coil movably and closely fitted in said space and traversed by an unbroken undulatory alternating current, substantially as described.

5. The combination of the magnet having inner and outer pole pieces, the reciprocating rod within the inner pole piece, arms attached to said reciprocating rod, and extending into the polar space between the pole pieces, and a coil carried by said arms and movable in said polar space.

6. The combination of the magnet having inner and outer pole pieces, the reciprocating rod within the inner pole piece, arms attached to said reciprocating rod, and extending through the inner pole piece into the field space between the pole pieces, and a coil carried by said arms and movable in said field space.

7. A reciprocating magnet for vibrating electro-motors having a bobbin or support with separators or diaphragms, and magnetically similar coils wound between said separators.

8. The combination in a reciprocating electric motor, of the reciprocating rod, the armature sleeved thereon, stops on said rod, and buffers between said armature and stops.

In witness whereof I have hereunto set my hand this 7th day of July, 1891.

ELIHU THOMSON.

Witnesses:
JOHN W. GIBBONEY,
JOHN T. BRODERICK.